US012703301B2

(12) United States Patent
Vasoya

(10) Patent No.: US 12,703,301 B2
(45) **Date of Patent: *Aug. 11, 2026**

(54) TRAILERING ASSIST SYSTEM WITH HITCH BALL POSITION DETECTION

(71) Applicant: Magna Electronics Inc., Auburn Hills, MI (US)

(72) Inventor: Jigneshkumar Natvarlal Vasoya, Gujarat (IN)

(73) Assignee: Magna Electronics Inc., Auburn Hills, MI (US)

( * ) Notice: Subject to any disclaimer, the term of this patent is extended or adjusted under 35 U.S.C. 154(b) by 681 days.

This patent is subject to a terminal disclaimer.

(21) Appl. No.: 18/190,200

(22) Filed: Mar. 27, 2023

(65) Prior Publication Data

US 2023/0234504 A1 Jul. 27, 2023

Related U.S. Application Data

(63) Continuation of application No. 16/947,178, filed on Jul. 22, 2020, now Pat. No. 11,613,210.

(Continued)

(51) Int. Cl.

*B60R 1/00* (2022.01)
*B60D 1/06* (2006.01)

(Continued)

(52) U.S. Cl.

CPC ................ *B60R 1/003* (2013.01); *B60D 1/06* (2013.01); *B60D 1/36* (2013.01); *B60R 1/26* (2022.01);

(Continued)

(58) Field of Classification Search

CPC ........... B60R 1/003; B60R 1/26; B60R 11/04; B60R 2300/808; B60D 1/06; B60D 1/36; B60D 1/245; B60D 1/62; G06T 7/74; G06T 7/97; G06T 2207/10016; G06T 7/73; G06T 2207/30252

See application file for complete search history.

(56) References Cited

U.S. PATENT DOCUMENTS 5,550,677 A 8/1996 Schofield et al.
5,670,935 A 9/1997 Schofield et al.

(Continued)

*Primary Examiner* — Valentin Neacsu
*Assistant Examiner* — Marlon A Arce
(74) *Attorney, Agent, or Firm* — HONIGMAN LLP

(57) ABSTRACT

A vehicular trailering assist system includes a camera disposed at a rear portion of a vehicle. With a trailer hitched to the vehicle at a hitch ball of the vehicle, the camera views at least a portion of the trailer. An electronic control unit includes an image processor operable to process frames of image data captured by the camera. With the trailer hitched to the vehicle at the hitch ball of the vehicle, the vehicular trailering assist system determines trailer feature points via image processing of image data captured by the camera, and determines respective perpendicular bisectors of respective line segments extending between the determined trailer feature points in respective frames of captured image data while the vehicle tows the trailer and turns. The vehicular trailering assist system determines a location of the hitch ball based at least in part on an intersection point of the determined perpendicular bisectors.

26 Claims, 13 Drawing Sheets

Related U.S. Application Data

(60) Provisional application No. 62/876,798, filed on Jul. 22, 2019.

(51) Int. Cl.
*B60D 1/36* (2006.01)
*B60R 1/26* (2022.01)
*B60R 11/04* (2006.01)
*G06T 7/00* (2017.01)
*G06T 7/73* (2017.01)

(52) U.S. Cl.
CPC ................ *B60R 11/04* (2013.01); *G06T 7/74* (2017.01); *G06T 7/97* (2017.01); *B60R 2300/808* (2013.01)

(56) References Cited

U.S. PATENT DOCUMENTS 5,949,331 A 9/1999 Schofield et al.
6,498,620 B2 12/2002 Schofield et al.
6,690,268 B2 2/2004 Schofield et al.
7,038,577 B2 5/2006 Pawlicki et al.
7,720,580 B2 5/2010 Higgins-Luthman
7,855,755 B2 12/2010 Weller et al.
9,085,261 B2 7/2015 Lu et al.
9,264,672 B2 2/2016 Lynam
9,446,713 B2 9/2016 Lu et al.
9,558,409 B2 1/2017 Pliefke et al.
10,071,687 B2 9/2018 Ihlenburg et al.
10,086,870 B2 10/2018 Gieseke et al.
10,099,614 B2 10/2018 Diessner
10,160,382 B2 12/2018 Pliefke et al.
10,532,698 B2 1/2020 Potnis et al.
10,552,976 B2 2/2020 Diessner et al.
10,586,119 B2 3/2020 Pliefke et al.
10,638,025 B2 4/2020 Gali et al.
10,706,291 B2 7/2020 Diessner et al.
10,733,757 B2 8/2020 Gupta et al.
10,755,110 B2 8/2020 Bajpai
10,780,752 B1 9/2020 Niewiadomski et al.
11,273,868 B2 * 3/2022 Gali ........................ B60R 11/04
11,377,029 B2 * 7/2022 Yunus ..................... B60R 1/003
11,417,116 B2 8/2022 Joseph et al.
11,511,801 B2 * 11/2022 Lavoie ................... B62D 13/06
11,613,210 B2 3/2023 Vasoya
2014/0063197 A1 3/2014 Yamamoto et al.
2014/0085472 A1 3/2014 Lu et al.
2014/0160276 A1 6/2014 Pliefke et al.
2014/0267688 A1 9/2014 Aich et al.
2015/0002670 A1 1/2015 Bajpai
2015/0217693 A1 8/2015 Pliefke et al.
2015/0321697 A1 * 11/2015 Lu ........................... B60C 9/005 701/28
2016/0049020 A1 2/2016 Kuehnle et al.
2017/0050672 A1 2/2017 Gieseke et al.
2017/0174128 A1 6/2017 Hu et al.
2017/0217372 A1 8/2017 Lu et al.
2017/0254873 A1 9/2017 Koravadi
2017/0280091 A1 9/2017 Greenwood et al.
2017/0341583 A1 11/2017 Zhang et al.
2018/0211528 A1 7/2018 Seifert
2018/0215382 A1 8/2018 Gupta et al.
2018/0253608 A1 9/2018 Diessner et al.
2018/0276838 A1 9/2018 Gupta et al.
2018/0276839 A1 9/2018 Diessner et al.
2019/0016264 A1 1/2019 Potnis et al.
2019/0039649 A1 2/2019 Gieseke et al.
2019/0042864 A1 2/2019 Pliefke et al.
2019/0064831 A1 2/2019 Gali et al.
2019/0086927 A1 * 3/2019 Skvarce ................... B60D 1/36
2019/0118860 A1 4/2019 Gali et al.
2019/0143895 A1 5/2019 Pliefke et al.
2019/0241126 A1 8/2019 Murad et al.
2019/0275941 A1 9/2019 Lu et al.
2019/0297233 A1 9/2019 Gali et al.
2019/0329821 A1 10/2019 Ziebart et al.
2019/0347498 A1 11/2019 Herman et al.
2019/0347825 A1 11/2019 Gupta et al.
2020/0017143 A1 1/2020 Gali
2020/0252588 A1 * 8/2020 Kiliman .................... B60R 1/26
2020/0334475 A1 10/2020 Joseph et al.
2020/0356788 A1 11/2020 Joseph et al.
2020/0361397 A1 11/2020 Joseph et al.
2020/0406967 A1 12/2020 Yunus et al.
2021/0078634 A1 3/2021 Jalalmaab et al.
2021/0086785 A1 * 3/2021 Niewiadomski ...... B60W 10/20
2021/0094473 A1 4/2021 Gali et al.
2021/0170820 A1 6/2021 Zhang
2021/0170947 A1 6/2021 Yunus et al.
2021/0197893 A1 * 7/2021 Okouneva ............ B62D 13/025

* cited by examiner

Reference Image

Current Image

| Hitch Ball Detection Performance | | | |
|---|---|---|---|
| **Performance Category** | **Number of videos** | **Performance (%)** | **Cumulative Performance (%)** |
| In Spec (+/- 2%): 27.93 - 29.07 | 22 | 19 | 19 |
| Almost In Spec (+/- 5%): 27.075 - 29.925 | 26 | 23 | 42 |
| Good (+/- 10%): 25.65 - 31.35 | 35 | 30 | 72 |
| Pretty Good (+/- 15%): 24.225 - 32.775 | 16 | 14 | 86 |
| Bad (+/- 20%): 22.8 - 34.2 | 5 | 4 | 90 |
| Very Bad: Outside +/- 20% | 11 | 10 | 100 |

| **Requirement(+/- 3cm): 25.5 - 31.5** | 85 | 74 |
|---|---|---|

FIG. 3A

Total Number of Videos: 115

| Average Absolute Hitch Length Error (in cm) | | |
|---|---|---|
| **Trailer Type** | **Number of videos** | **Avg. Error (cm)** |
| Boat | 20 | 8.81 |
| Camper | 14 | 10.29 |
| Chipper | 23 | 3.16 |
| Horse | 18 | 3.59 |
| Utility | 20 | 2.24 |
| Y_Trailer | 20 | 3.70 |

*Actual Hitch length is 28.5 cm

FIG. 3B

| Test Scenarios | |
|---|---|
| **No.** | **Scenario Detail** |
| 1. | Trailer types<br>(e.g. Boat, Camper, Chipper, Horse, Utility, Y trailer) |
| 2. | Road types<br>(e.g. Asphalt, Concrete, Grass) |
| 3. | Lighting conditions<br>(e.g. Day, Night, Shadow) |

FIG. 3C

FIG. 10A
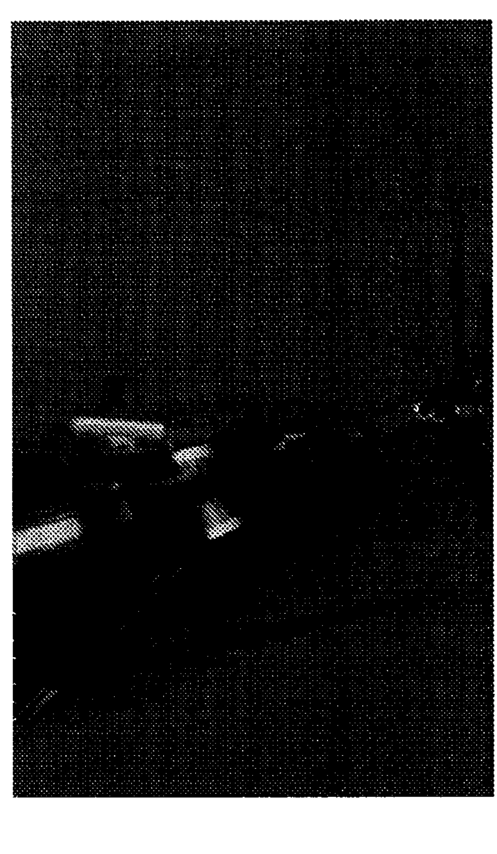
FIG. 10B
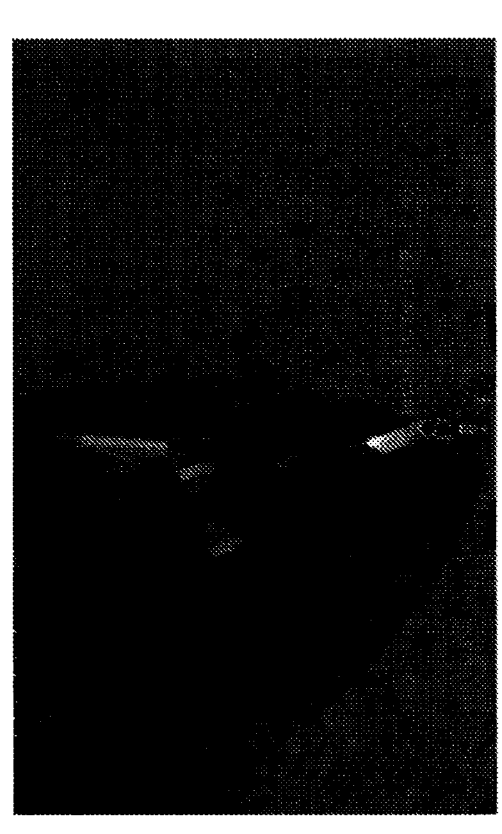
FIG. 10C
FIG. 10D

TRAILERING ASSIST SYSTEM WITH HITCH BALL POSITION DETECTION

CROSS REFERENCE TO RELATED APPLICATIONS

The present application is a continuation of U.S. patent application Ser. No. 16/947,178, filed Jul. 22, 2020, now U.S. Pat. No. 11,613,210, which claims the filing benefits of U.S. provisional application Ser. No. 62/876,798, filed Jul. 22, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Trailer assist systems are known that may determine an angle of a trailer hitched at a vehicle. Examples of such known systems are described in U.S. Pat. Nos. 9,085,261 and/or 6,690,268, which are hereby incorporated herein by reference in their entireties.

SUMMARY OF THE INVENTION

The present invention provides a driver assistance system or vision system or imaging system for a vehicle that utilizes a camera disposed at a rear portion of a vehicle and having a field of view exterior of the vehicle, the field of view encompassing at least a portion of a trailer hitched to the vehicle. The system also includes a control comprising an image processor operable to process image data captured by the camera, with the image data captured by the camera representative of the trailer hitched to the vehicle. The control is operable to perform feature matching on two or more frames of captured image data. The control selects at least two matched point pairs determined from the feature matching. The control determines perpendicular bisectors of the selected point pairs and determines an intersection point of the perpendicular bisectors. The control determines a location of the hitch ball based on the intersection point.

These and other objects, advantages, purposes and features of the present invention will become apparent upon review of the following specification in conjunction with the drawings.

BRIEF DESCRIPTION OF THE DRAWINGS

FIGS. 3A-3C is an exemplary table of data from a variety of trailer types, road types, and lighting conditions.

FIGS. 10A-10D are perspective views of a boat trailer with feature outlier filtering in accordance with the present invention.

DESCRIPTION OF THE PREFERRED EMBODIMENTS

A vehicle and trailer maneuvering system or maneuver assist system and/or driving assist system operates to capture images exterior of the vehicle and of a trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The vision system includes an image processor or image processing system that is operable to receive image data from one or more cameras and that may provide an output to a display device for displaying images representative of the captured image data. Optionally, the vision system may provide a display, such as a rearview display or a top down or bird's eye or surround view display or the like.

Figure 1:
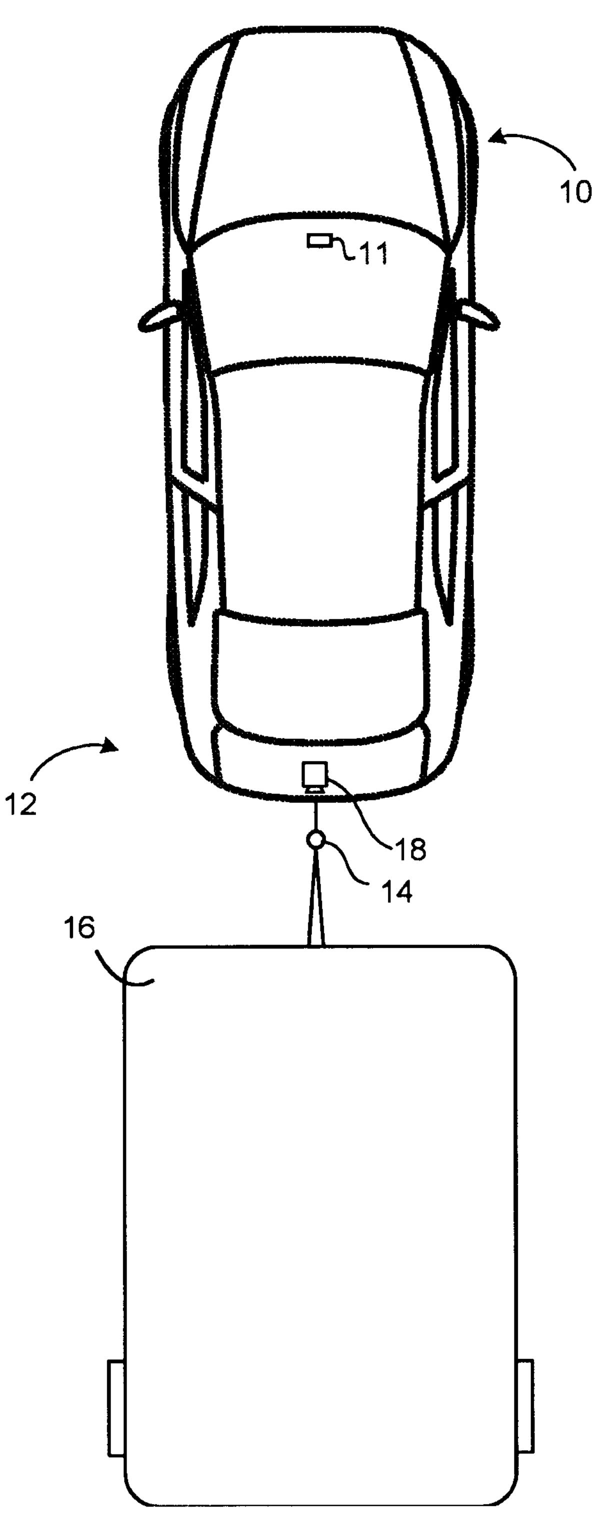
FIG. 1 is a plan view of a vehicle with a trailer assist system that is operable to steer a trailer along a trailer direction in accordance with the present invention.

Referring now to the drawings and the illustrative embodiments depicted therein, a vehicle 10 includes a trailer maneuver assist system 12 that is operable to assist in backing up or reversing the vehicle with a hitched trailer that is hitched at the rear of the vehicle via a hitch 14, and the system may maneuver the vehicle 10 and the trailer 16 toward a desired or selected location. The trailer maneuver assist system 12 includes at least one exterior viewing vehicle-based imaging sensor or camera, such as a rearward viewing imaging sensor or camera 18 (and the system may optionally include multiple exterior viewing imaging sensors or cameras, such as a sideward/rearward viewing camera at respective sides of the vehicle), which captures image data representative of the scene exterior and rearward of the vehicle 10, with the field of view of the camera encompassing the hitch 14 and/or at least a portion of the trailer 16, and with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like).

The trailer maneuver assist system 12 includes a control 11 or electronic control unit (ECU) having a processor that is operable to process image data captured by the camera or cameras and that may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

With advanced driver-assistance or driving-assistance (ADAS) systems, trailer angle measurement is an application that assists drivers of a vehicle hitched to a trailer in backing up the towing vehicle and warning against jackknife situations and collisions. These trailer angle measurement systems generally deliver the angle between the towing vehicle and the trailer by processing image data captured by the rear-facing camera of the vehicle.

Trailers are typically coupled to the towing vehicle via a hitch ball. This hitch ball is the attachment point for the trailer's coupler which allows the trailer to pivot and provide smooth turning while towing. Thus, it is advantageous for a trailer angle detection system to detect the hitch ball position to accurately calculate trailer angle. The present invention provides a system and method that determines the position of the hitch ball while the trailer is connected to the towing vehicle. The system processes a top-down image captured by rear-facing camera connected to the towing vehicle. The system detects the position of the hitch ball and relies on the principle that perpendicular bisectors of any chord pass through the center of a circle. The system processes the captured frames of image data while the trailer sways around the hitch ball while maneuvering the vehicle. The present invention detects the hitch ball position as a center of rotation of the trailer accurately and is robust enough to handle various scenarios like different trailer types, road types, and lighting conditions.

The control processes and performs feature matching between two frames of captured image data and determines matched point pairs between the two matching images. The control selects at least two matched point pairs from the determined matched point pairs. The control calculates perpendicular bisectors of the corresponding selected feature point pairs and calculate an intersection point (i.e. a center of rotation) of the calculated bisectors. These steps may be repeated for any number of frames (e.g., for fifty frames) and median filtering may be applied to remove any outliers from the calculated intersection points. The control calculates the hitch position by averaging the calculated intersection points.

Figure 2A:
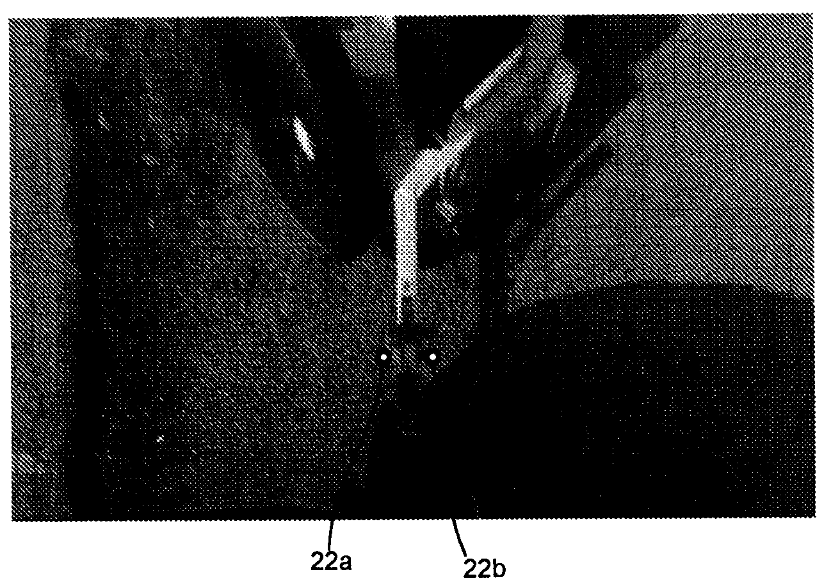
FIGS. 2A and 2B are perspective views of a reference image and a current image of a trailer with matched feature points and perpendicular bisectors in accordance with the present invention.
Figure 2B:
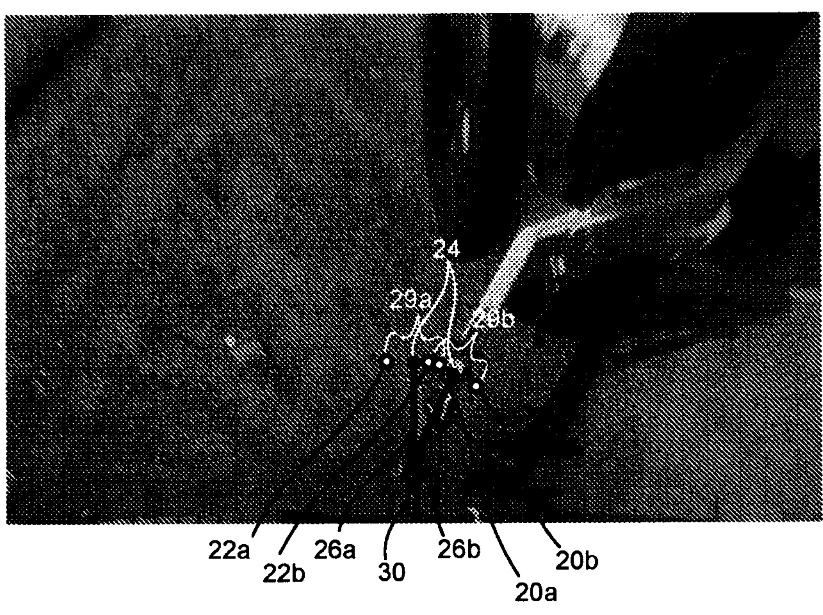

The control may use a wide variety of feature matching algorithms. For example, the control may use binary robust invariant scalable keypoints (BRISK). As illustrated in FIGS. 2A and 2B, BRISK matching may be performed on a reference image (FIG. 2B) with a trailer angle of approximately zero degrees and a current image (i.e., an image captured with the current trailer angle) with a greater trailer angle (e.g., greater than 10 degrees).

For example, the control may match current image feature points 20 with reference image feature points 22 and calculate a center point 24 of the matched feature point pair. The control determines perpendicular bisectors 26 of the matched feature point pairs and at their intersection point 30, determines the hitch ball position.

Figure 2C:
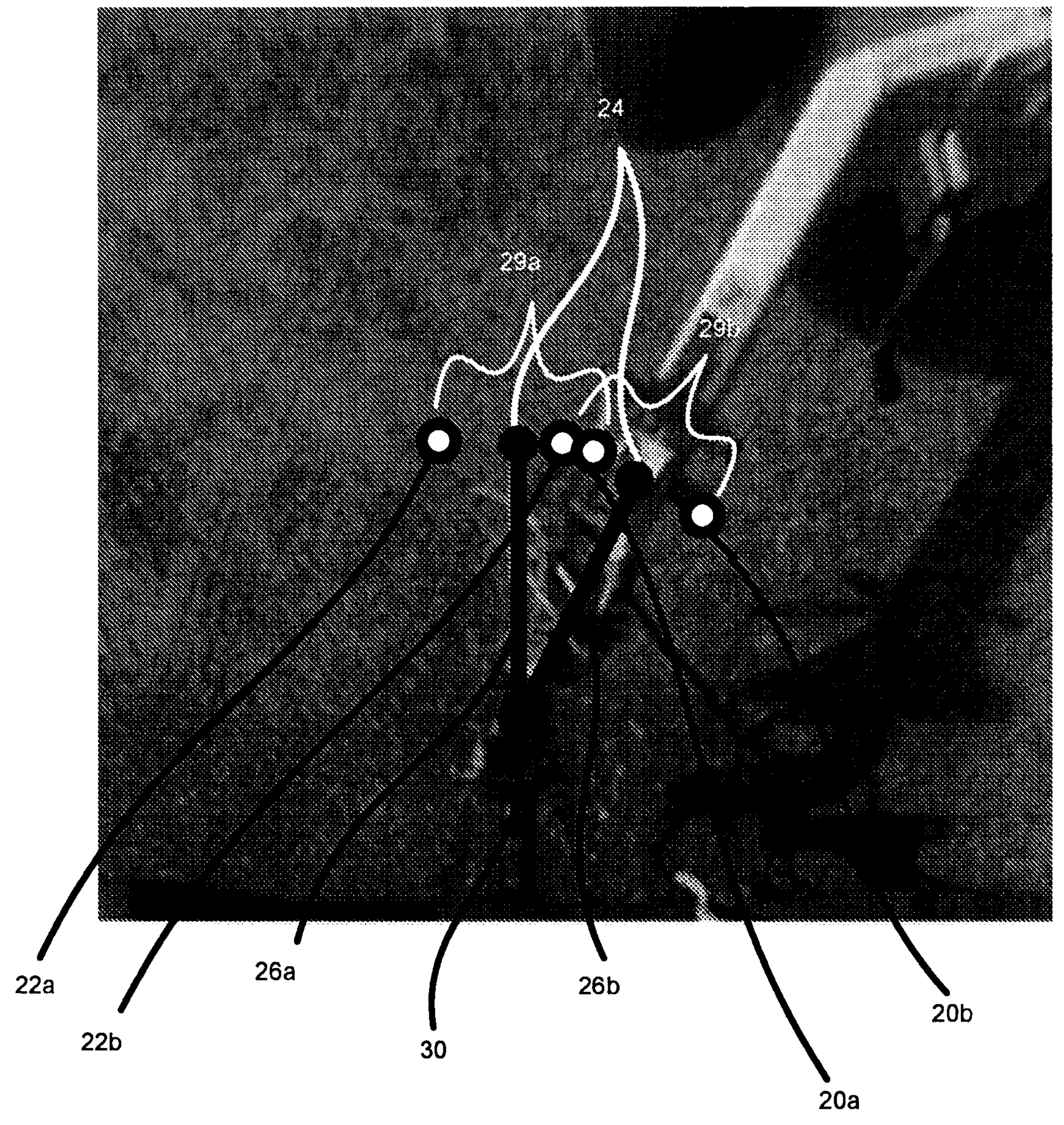
FIG. 2C is an enlarged view of the trailer and hitch of FIG. 2B.
Figure 4B:
FIGS. 4A and 4B are perspective views of a horse trailer with a matched feature point pair in accordance with the present invention.
Figure 4A:
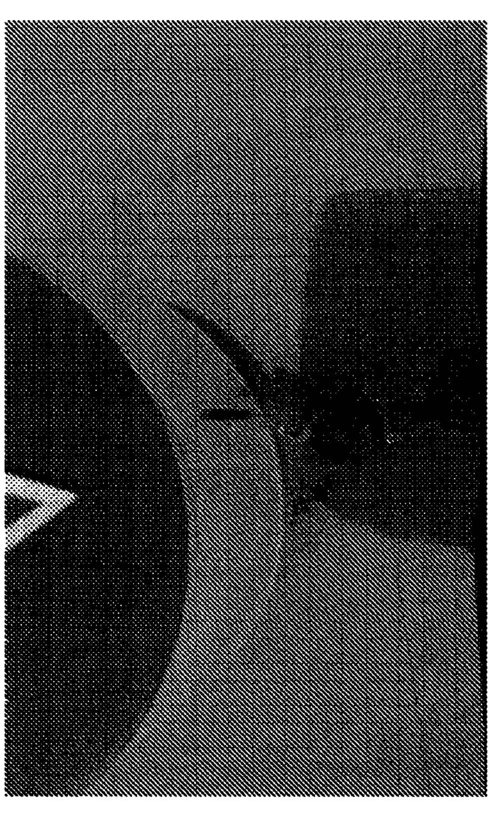
Figure 5B:
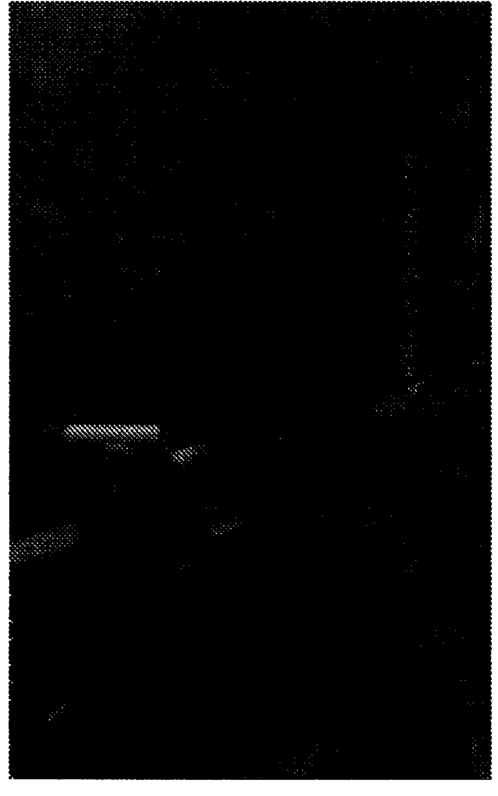
FIGS. 5A and 5B are perspective views of a boat trailer with a matched feature point pair in accordance with the present invention.
Figure 5A:
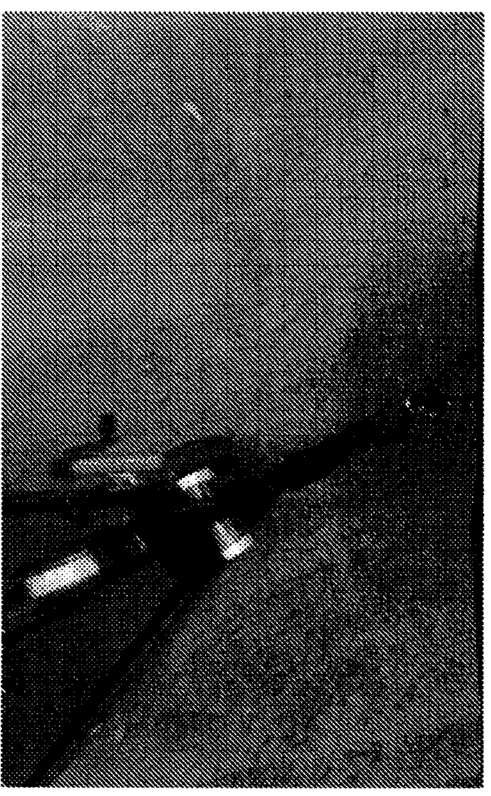
Figure 6B:
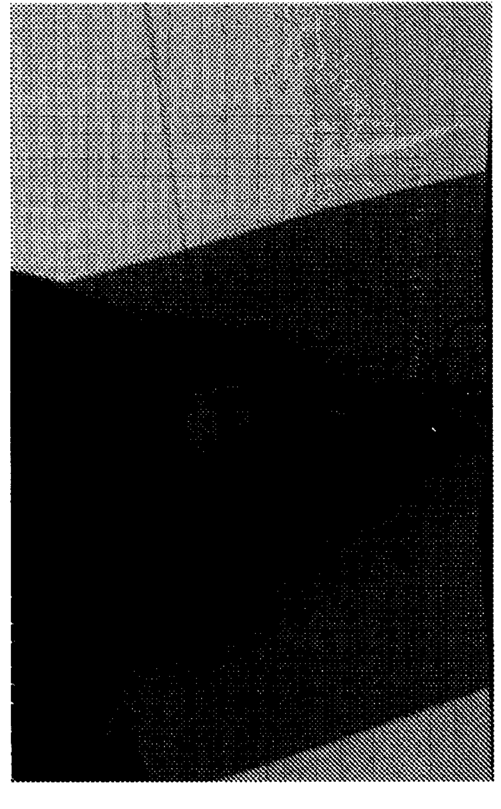
FIGS. 6A and 6B are perspective views of a camper trailer with a matched feature point pair in accordance with the present invention.
Figure 6A:
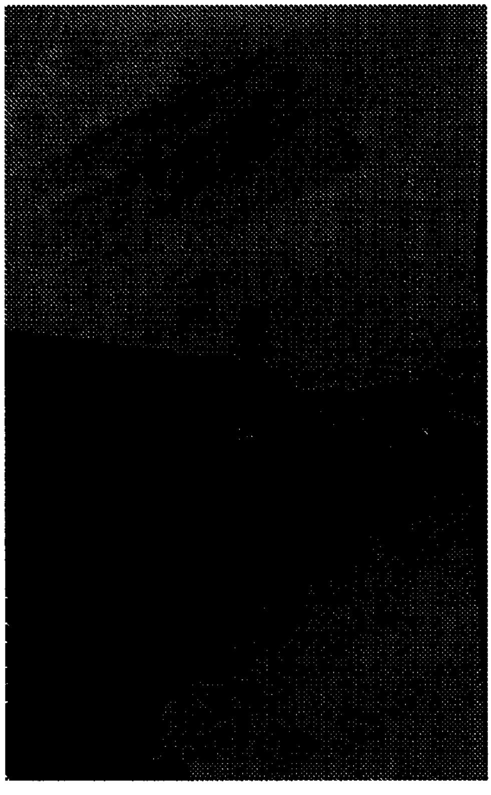
Figure 7B:
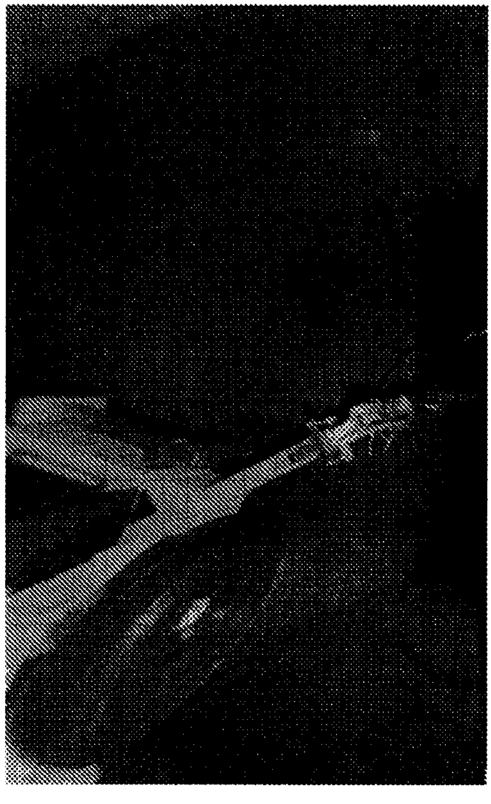
FIGS. 7A and 7B are perspective views of a chipper trailer with a matched feature point pair in accordance with the present invention.
Figure 7A:
Figure 8B:
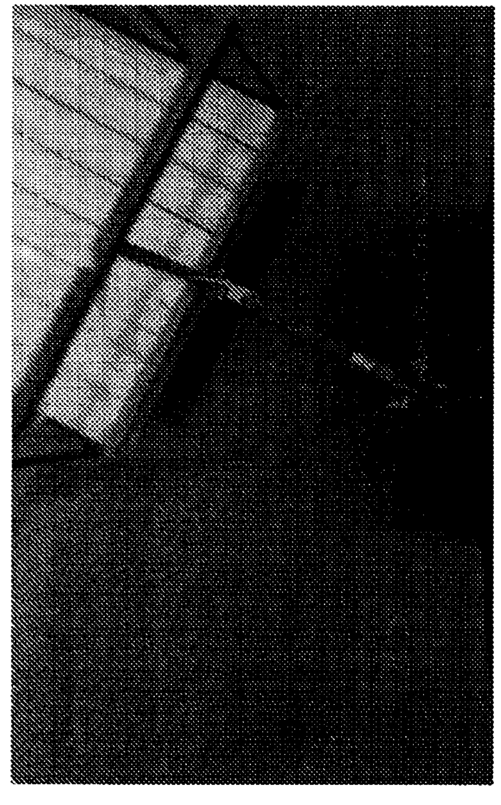
FIGS. 8A and 8B are perspective views of a utility trailer with a matched feature point pair in accordance with the present invention.
Figure 8A:
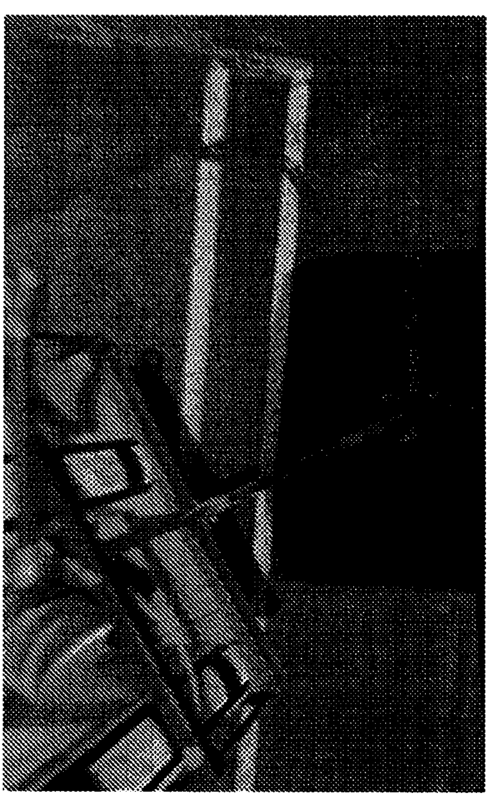

More specifically, as illustrated in FIG. 2A, the system may determine one or more reference image feature points 22 located on the hitch in a frame of image data captured by the camera. Here, the system determined two reference points 22*a*, 22*b*. The system stores these reference image feature point(s) for later use. As illustrated in FIGS. 2B and 2C, after the trailer angle changes (i.e., due to the towing vehicle and/or the trailer turning), the system determines one or more current image feature points 20. Here, the system has determined two current image feature points 20*a*, 20*b* (which are the current location of the determined reference points 22*a*, 22*b*, respectively). The system matches each reference image feature point 22 to a corresponding current image feature point 20. For example, FIGS. 2B and 2C illustrate the matching the reference image feature point 22*a* to the current image feature point 20*a* and the reference image feature point 22*b* to the current image feature point 22*b* to determine a matched pair or set 29*a* of feature points and a matched pair or set 29*b* of feature points.

The system may determine a center point 24 between each pair or set of matched feature points. The center point 24 is defined as the midway point between a line segment drawn from the reference image feature point 22 and the corresponding current image feature point 20. The system may determine perpendicular bisectors 26 that are lines perpendicular to the respective line segment that starts at a reference image feature point 22 and ends at the corresponding matched current image feature point 20. In FIGS. 2B and 2C, the perpendicular bisector 26*a* corresponds to the matched feature points 29*a* (the reference feature point 22*a* and the current feature point 20*a*) while the perpendicular bisector 26*b* corresponds to the matched feature points 29*b* (the reference feature point 22*b* and the current feature point 20*b*). Because perpendicular bisectors 26 are perpendicular to chords of a circle with the hitch ball position at the center, the intersection point of the two (or more) perpendicular bisectors 26 determines the hitch ball position 30.

Thus, the system captures at least two frames of image data, with each frame of captured image data having two spaced apart feature points of the trailer. Each feature point in one captured frame of image data is matched with that feature point in at least one other captured frame of image data (e.g., a reference frame of image data) and a line segment is determined that extends between the matched feature points of each of the sets of feature points. In other words, and such as shown in FIG. 2C, each line segment is determined between the location one feature point in one frame (such as in the first captured frame of image data or a reference frame of captured image data) and the location of that feature point in another frame (such as in the second captured frame of image data), and this is done for two (or more) spaced apart feature points in each frame. The system may continue to compare feature points from two new frames of image data. Optionally, the system may continue to compare a new frame of image data to the same reference frame of image data. The location of the determined and matched feature points corresponds with the location of photosensor elements of the imager of the camera that are representative of the location of the actual trailer feature points present in the field of view of the camera. A perpendicular bisector is determined for each line segment and the intersection of the perpendicular bisectors is the pivot point of the trailer hitch (i.e., the center of the hitch ball at the rear of the vehicle).

Figure 9B:
FIGS. 9A and 9B are perspective views of a Y trailer with a matched feature point pair in accordance with the present invention.
Figure 9A:
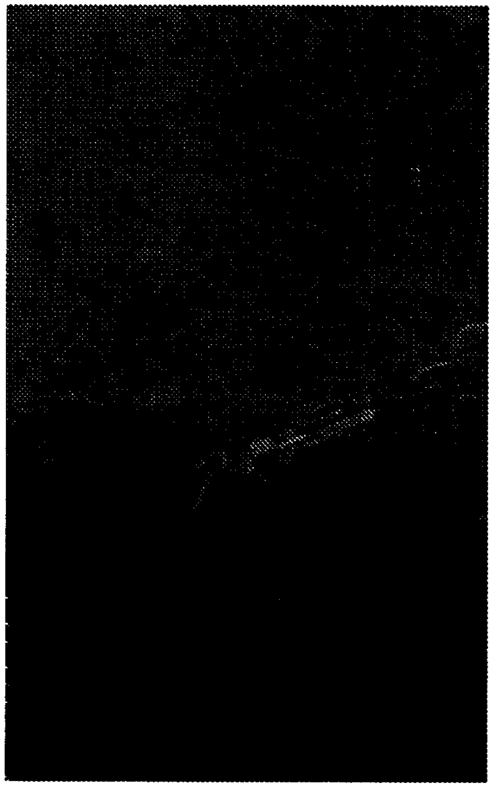

FIGS. 3A-3C illustrate exemplary performance data using a variety of different trailer types, road types, and lighting conditions. As illustrated in FIGS. 4A-9B, the described system and method is applicable to a wide range of trailer types, road types, and lighting conditions. For example, the system accurately determines the hitch ball location of horse trailers (FIGS. 4A and 4B), boat trailers (FIGS. 5A and 5B), camper trailers (FIGS. 6A and 6B), chipper trailers (FIGS. 7A and 7B), utility trailers (FIGS. 8A and 8B) and Y trailers (FIGS. 9A and 9B). Also illustrated in these figures are bright lighting conditions (e.g., FIG. 4A), dark lighting conditions (e.g., FIG. 5B), asphalt road conditions (e.g., FIG. 8A), concrete road conditions (e.g., FIG. 7A), etc.

Figure 11B:
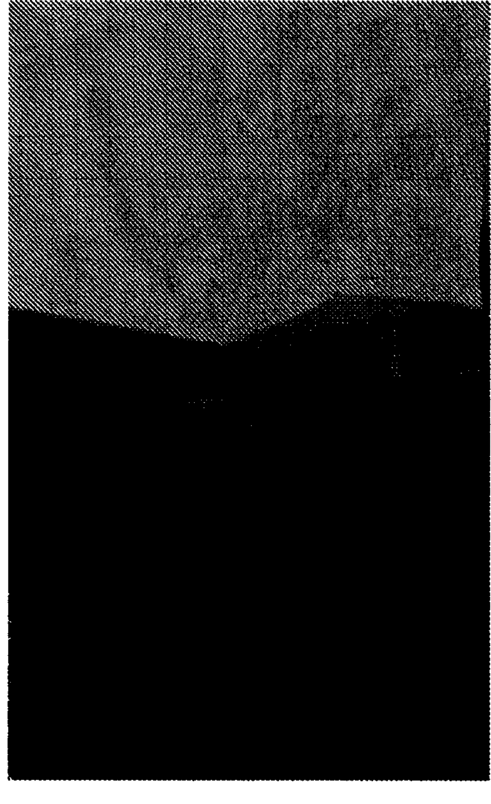
FIGS. 11A and 11B are perspective views of a camper trailer with feature outlier filtering in accordance with the present invention.
Figure 11A:

Referring now to FIGS. 10A-11B, occasionally non-trailer part features point pairs are matched (e.g., grass/road features). However, this may be overcome through the use of feature outlier filtering (e.g., median filtering). FIGS. 10A-10D illustrate feature outlier filtering with a boat trailer and FIGS. 11A-11B illustrate feature outlier filtering with a camper trailer.

Thus, the present invention detects or determines a hitch ball position using a center of rotation (COR) approach which helps further in trailer angle estimation. The system accurately determines the hitch ball location over a variety of different trailer types, road types, and lighting conditions. For example, the system may be within +/−15 percent of the hitch ball location 86 percent of the time and within 3 cm 74 percent of time. Moreover, observed false positives cases may be handled using additional pre-processing in feature matching.

The system may utilize aspects of the trailering assist systems or trailer angle detection systems or trailer hitch assist systems described in U.S. Pat. Nos. 9,085,261 and/or 6,690,268, and/or U.S. Publication Nos. US-2020-0017143; US-2019-0297233; US-2019-0347825; US-2019-0275941; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0050672; US-2015-0217693; US-2014-0160276; US-2014-0085472 and/or US-2015-0002670, and/or U.S. patent application Ser. No. 16/946,542, filed on Jun. 26, 2020 and published Dec. 31, 2020 as U.S. Publication No. US-2020-0406967, Ser. No. 15/929,535, filed on May 8, 2020 and published Nov. 12, 2020 as U.S. Publication No. US-2020-0356788, and/or Ser. No. 16/850,300, filed on Apr. 16, 2020, now U.S. Pat. No. 11,417,116, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663;

5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailering assist system, the vehicular trailering assist system comprising:

a camera disposed at a rear portion of a vehicle equipped with the vehicular trailering assist system, the camera viewing at least rearward of the vehicle, wherein, with a trailer hitched to the vehicle at a hitch ball of the vehicle, the camera views at least a portion of the trailer hitched to the vehicle, and wherein the camera is operable to capture frames of image data;

an electronic control unit (ECU) comprising electronic circuitry and associated software;

wherein the electronic circuitry comprises an image processor operable to process frames of image data captured by the camera;

wherein, with the trailer hitched to the vehicle at the hitch ball of the vehicle, the vehicular trailering assist system determines trailer feature points via image processing at the ECU of image data captured by the camera;

wherein, with the trailer hitched to the vehicle at the hitch ball of the vehicle, the vehicular trailering assist system, via image processing at the ECU of multiple frames of image data captured by the camera while the vehicle tows the trailer and turns, determines respective perpendicular bisectors of respective line segments extending between the determined trailer feature points in respective frames of image data captured by the camera while the vehicle tows the trailer and turns; and wherein the vehicular trailering assist system determines location of the hitch ball based at least in part on an intersection point of the determined perpendicular bisectors.

2. The vehicular trailering assist system of claim 1, wherein the vehicular trailering assist system (i) performs feature matching over a plurality of pairs of frames of captured image data and (ii) determines perpendicular bisectors for respective pairs of frames of captured image data to determine the intersection point for the determined perpendicular bisectors of the respective pair of frames of captured image data, and wherein the vehicular trailering assist system determines the location of the hitch ball based on an average of the intersection points.

3. The vehicular trailering assist system of claim 2, wherein the vehicular trailering assist system performs median filtering on the intersection points to remove outliers.

4. The vehicular trailering assist system of claim 2, wherein the vehicular trailering assist system determines fifty intersection points from at least fifty pairs of frames of captured image data.

5. The vehicular trailering assist system of claim 1, wherein the vehicular trailering assist system determines at least two pairs of matched trailer feature points via feature matching of determined trailer feature points over at least two frames of captured image data.

6. The vehicular trailering assist system of claim 5, wherein the vehicular trailering assist system performs feature matching using a binary robust invariant scalable keypoints algorithm.

7. The vehicular trailering assist system of claim 5, wherein the vehicular trailering assist system performs feature matching on a reference frame of captured image data where trailer angle is zero degrees, and wherein the vehicular trailering assist system performs feature matching on a current frame of captured image data where the trailer angle is not zero degrees.

8. The vehicular trailering assist system of claim 5, wherein the vehicular trailering assist system determines the perpendicular bisectors based on determining a center point of the at least two pairs of matched trailer feature points.

9. The vehicular trailering assist system of claim 8, wherein the at least two pairs of matched trailer feature points comprises (i) a first matched trailer feature point pair comprising a first trailer feature point in a respective first frame of captured image data and that first trailer feature point in a respective second frame of captured image data and (ii) a second matched trailer feature point pair comprising a second trailer feature point in a respective first frame of captured image data and that second trailer feature point in a respective second frame of captured image data.

10. The vehicular trailering assist system of claim 9, wherein the respective line segments comprise (i) a first line segment that extends between the first trailer feature point in respective first frames of captured image data and the first trailer feature point in respective second frames of captured image data and (ii) a second line segment that extends between the second trailer feature point in respective first frames of captured image data and the second trailer feature point in respective second frames of captured image data.

11. The vehicular trailering assist system of claim 10, wherein the determined perpendicular bisectors comprise a first perpendicular bisector of the first line segment and a second perpendicular bisector of the second line segment.

12. The vehicular trailering assist system of claim 1, wherein the vehicular trailering assist system, responsive to determining the location of the hitch ball, determines trailer angle of the trailer relative to the vehicle.

13. The vehicular trailering assist system of claim 12, wherein the vehicular trailering assist system, responsive to determining the trailer angle of the trailer relative to the vehicle, alerts a driver of the vehicle of a potential jack-knife situation.

14. The vehicular trailering assist system of claim 1, wherein the vehicular trailering assist system determines the location of the hitch ball at least in part based on a center of rotation of the trailer.

15. The vehicular trailering assist system of claim 1, wherein the camera comprises an imager having a two dimensional array of photosensing elements, and wherein the line segments are determined between locations of photosensing elements of the imager that are representative of locations of the respective determined trailer feature points.

16. A vehicular trailering assist system, the vehicular trailering assist system comprising:

a camera disposed at a rear portion of a vehicle equipped with the vehicular trailering assist system, the camera viewing at least rearward of the vehicle, wherein, with a trailer hitched to the vehicle at a hitch ball of the vehicle, the camera views at least a portion of the trailer hitched to the vehicle, and wherein the camera is operable to capture frames of image data;

an electronic control unit (ECU) comprising electronic circuitry and associated software;

wherein the electronic circuitry comprises an image processor operable to process frames of image data captured by the camera;

wherein, with the trailer hitched to the vehicle at the hitch ball of the vehicle, the vehicular trailering assist system determines trailer feature points via image processing at the ECU of image data captured by the camera;

wherein, with the trailer hitched to the vehicle at the hitch ball of the vehicle, the vehicular trailering assist system, via image processing at the ECU of multiple frames of image data captured by the camera while the vehicle tows the trailer and turns, (i) determines at least two pairs of matched trailer feature points in respective frames of image data captured by the camera via feature matching of determined trailer feature points and (ii) determines respective perpendicular bisectors of respective line segments extending between the determined trailer feature points of the respective pair of matched trailer feature points in respective frames of image data captured by the camera while the vehicle tows the trailer and turns;

wherein the vehicular trailering assist system determines location of the hitch ball based at least in part on an intersection point of the determined perpendicular bisectors; and wherein the vehicular trailering assist system, responsive to determining the location of the hitch ball, determines trailer angle of the trailer relative to the vehicle.

17. The vehicular trailering assist system of claim 16, wherein the vehicular trailering assist system performs feature matching on a reference frame of captured image data where the trailer angle is zero degrees, and wherein the vehicular trailering assist system performs feature matching on a current frame of captured image data where the trailer angle is not zero degrees.

18. The vehicular trailering assist system of claim 16, wherein the vehicular trailering assist system determines the perpendicular bisectors based on determining a center point of the at least two pairs of matched trailer feature points.

19. The vehicular trailering assist system of claim 18, wherein the at least two pairs of matched trailer feature points comprises (i) a first matched trailer feature point pair comprising a first trailer feature point in a respective first frame of captured image data and that first trailer feature point in a respective second frame of captured image data and (ii) a second matched trailer feature point pair comprising a second trailer feature point in a respective first frame of captured image data and that second trailer feature point in a respective second frame of captured image data, and wherein the respective line segments comprise (i) a first line segment that extends between the first trailer feature point in the respective first frame of captured image data and the first trailer feature point in the respective second frame of captured image data and (ii) a second line segment that extends between the second trailer feature point in the respective first frame of captured image data and the second trailer feature point in the respective second frame of captured image data, and wherein the determined perpendicular bisectors comprise a first perpendicular bisector of the first line segment and a second perpendicular bisector of the second line segment.

20. The vehicular trailering assist system of claim 16, wherein the vehicular trailering assist system, responsive to determining the trailer angle of the trailer relative to the vehicle, alerts a driver of the vehicle of a potential jack-knife situation.

21. The vehicular trailering assist system of claim 16, wherein the vehicular trailering assist system determines the location of the hitch ball at least in part based on a center of rotation of the trailer.

22. A vehicular trailering assist system, the vehicular trailering assist system comprising:

a camera disposed at a rear portion of a vehicle equipped with the vehicular trailering assist system, the camera viewing at least rearward of the vehicle, wherein, with a trailer hitched to the vehicle at a hitch ball of the vehicle, the camera views at least a portion of the trailer hitched to the vehicle, and wherein the camera is operable to capture frames of image data;

an electronic control unit (ECU) comprising electronic circuitry and associated software;

wherein the electronic circuitry comprises an image processor operable to process frames of image data captured by the camera;

wherein, with the trailer hitched to the vehicle at the hitch ball of the vehicle, the vehicular trailering assist system determines trailer feature points via image processing at the ECU of image data captured by the camera;

wherein, with the trailer hitched to the vehicle at the hitch ball of the vehicle, the vehicular trailering assist system matches determined trailer feature points in first frames of captured image data while the vehicle tows the trailer and is not turning, and wherein the vehicular trailering assist system matches determined trailer feature points in second frames of captured image data while the vehicle tows the trailer and turns;

wherein respective perpendicular bisectors of respective line segments extending between the matched determined trailer feature points are determined;

wherein the vehicular trailering assist system determines location of the hitch ball based at least in part on an intersection point of the determined perpendicular bisectors; and wherein the vehicular trailering assist system, responsive to determining the location of the hitch ball, determines trailer angle of the trailer relative to the vehicle.

23. The vehicular trailering assist system of claim 22, wherein the vehicular trailering assist system (i) performs feature matching over a plurality of pairs of frames of captured image data and (ii) determines perpendicular bisectors for respective pairs of frames of captured image data to determine the intersection point for the determined perpendicular bisectors of the respective pair of frames of captured image data, and wherein the vehicular trailering assist system determines the location of the hitch ball based on an average of the intersection points.

24. The vehicular trailering assist system of claim 22, wherein the vehicular trailering assist system determines the perpendicular bisectors based on determining a center point of the matched determined trailer feature points.

25. The vehicular trailering assist system of claim 22, wherein the vehicular trailering assist system, responsive to determining the trailer angle of the trailer relative to the vehicle, alerts a driver of the vehicle of a potential jack-knife situation.

26. The vehicular trailering assist system of claim 22, wherein the vehicular trailering assist system determines the location of the hitch ball at least in part based on a center of rotation of the trailer.

* * * * *